(12) United States Patent
Andrivon et al.

(10) Patent No.: US 11,575,944 B2
(45) Date of Patent: Feb. 7, 2023

(54) METHOD AND APPARATUS FOR ENCODING AN IMAGE

(71) Applicant: InterDigital VC Holdings, Inc., Wilmington, DE (US)

(72) Inventors: Pierre Andrivon, Liffre (FR); Marie-Jean Colaitis, Cesson-Sevigne (FR); David Touze, Rennes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/259,884

(22) PCT Filed: Jul. 2, 2019

(86) PCT No.: PCT/US2019/040225
§ 371 (c)(1),
(2) Date: Jan. 12, 2021

(87) PCT Pub. No.: WO2020/014034
PCT Pub. Date: Jan. 16, 2020

(65) Prior Publication Data
US 2021/0297707 A1    Sep. 23, 2021

(30) Foreign Application Priority Data

Jul. 12, 2018  (EP) .................................... 18305942

(51) Int. Cl.
*H04N 19/00* (2014.01)
*H04N 19/85* (2014.01)
(Continued)

(52) U.S. Cl.
CPC ............. *H04N 19/85* (2014.11); *H04N 19/14* (2014.11); *H04N 19/182* (2014.11); *H04N 19/186* (2014.11)

(58) Field of Classification Search
CPC ...... H04N 19/85; H04N 19/14; H04N 19/182; H04N 19/186
See application file for complete search history.

(56) References Cited

U.S. PATENT DOCUMENTS

2018/0242006 A1* 8/2018 Kerofsky ............. H04N 19/186

FOREIGN PATENT DOCUMENTS

| CN | 103209324 A | 1/2018 |
| TW | 201717627 A | 5/2017 |
| WO | WO 2013107314 A1 | 7/2013 |

OTHER PUBLICATIONS

Diaz et al., "Integrating HEVC Video Compression with a High Dynamic Range Video Pipeiine", SMPTE Motion Imaging Journal, vol. 125, No. 1, Jan. 2016, pp. 14-21.
(Continued)

*Primary Examiner* — Zhihan Zhou
(74) *Attorney, Agent, or Firm* — Condo Roccia Koptiw LLP

(57) ABSTRACT

The present embodiments obtain chroma components representative of the chroma components of an output image from color components representative of an input image, and if a value of a pixel in at least one of said chroma components exceeds a given value, modify the value of said pixel in at least one of said color components in such a way that the value of said pixel in said at least one of said chroma components is lower than or equals to said given value.

20 Claims, 7 Drawing Sheets

(51) Int. Cl.
*H04N 19/14* (2014.01)
*H04N 19/182* (2014.01)
*H04N 19/186* (2014.01)

(56) References Cited

OTHER PUBLICATIONS

Anonymous, "Dynamic Metadata for Color Volume Transform—Application #2", The Society of Motion Picture and Television Engineers, SMPTE Standard, SMPTE ST 2094-20:2016. Jul. 6, 2016, 23 pages.
Anonymous, "High Efficiency Video Coding", Telecommunication Standardization Sector of ITU, Series H: Audiovisual and Multimedia Systems, Infrastructure of audiovisual services—Coding of moving video, Recommendation ITU-T H.265, Feb. 2018, 692 pages.
Anonymous, "Advanced Video Coding for Generic Audiovisual Services", Telecommunication Standardization Sector of ITU, Series H: Audiovisual and Multimedia Systems, infrastructure of audiovisual services—Coding of moving video, Recommendation ITU-T H.264, Apr. 2017, 812 pages.
Galpin et al., "Adaptive Clipping in JEM 2.0", Joint Video Exploration Team (JVET) of ITU-T SG16 WP3 and ISO/IEC JTC 1/SC 29/WG 11, Document JVET-C0040-r3, 3rd Meeting, Geneva, Switzerland, May 26, 2016, 7 pages.
Anonymous, "High Dynamic Range Electro-Optical Transfer Function of Mastering Reference Displays", Society of Motion Picture and Television Engineers, SMPTE ST 2084:2014. Aug. 16, 2014, 14 pages.
Anonymous, "Mastering Display Color Volume Metadata Supporting High Luminance and Wide Color Gamut Images", Society of Motion Picture Television Engineers (SMPTE) Standard, SMPTE ST 2086:2014, Oct. 13, 2014, pp. 1-6.
Touze D., "Technicolor HDR Content Usage", International Organization for Standardization, ISO/IEC JTC1/SC29/WG11, Document MPEG2014/M34078, Saporo, Japan, Jul. 2014, 9 pages.
Anonymous, "High-Performance Single Layer High Dynamic Range (HDR) System for use in Consumer Electronics devices; Part 2: Enhancements for Perceptual Quantization (PQ) transfer function based High Dynamic Range (HDR) Systems (SL-HDR2)", ETSI and European Broadcasting Union, ETSI TS 103 433-2 V1.1.1, Jan. 2018, 45 pages.
Anonymous, "High-Performance Single Layer High Dynamic Range (HDR) System for use in Consumer Electronics devices; Part 1: Directly Standard Dynamic Range (SDR) Compatible HDR System (SL-HDR1)", ETSI and European Broadcasting Union, ETSI TS 103 433-1 V1.2.1, Aug. 2017, 123 pages.
ITU-R, "Image Parameter Values for High Dynamic Range Television for Use in Production and International Programme Exchange", Recommendation ITU-R BT.2100-1, BT Series, Broadcasting Service (Television), Geneva, Jun. 2017, 16 pages.
ITU-R, "Parameter Values for the HDTV Standards for Production and International Programme Exchange", Recommendation ITU-R BT.709-6, BT Series, Broadcasting Service (Television), Geneva, Jun. 2015, 19 pages.
ITU-R, "Parameter Values for Ultra-High Definition Television Systems for Production and International Programme Exchange", Recommendation ITU-R BT.2020-2, BT Series, Broadcasting Service (Television), Geneva, Oct. 2015, 8 pages.
Wang, et al., "Overview of the Second Generation AVS Video Coding Standard (AVS2)", ZTE Communications, vol. 14, No. 1, Feb. 2, 2016, pp. 3-11.

* cited by examiner

METHOD AND APPARATUS FOR ENCODING AN IMAGE

This application is the National Stage Entry under 35 U.S.C. § 371 of Patent Cooperation Treaty Application No. PCT/US2019/040225, filed Jul. 2, 2019, which was published in accordance with PCT Article 21(2) on Jan. 16, 2020, in English, and which claims the benefit of European Patent Application No. 18305942.7, filed Jul. 12, 2018.

1. FIELD

The present embodiments relate to distributing HDR video while preserving high fidelity of resulting videos.

2. BACKGROUND

The present section is intended to introduce the reader to various aspects of art, which may be related to various aspects of the present embodiments that are described and/or claimed below. This discussion is believed to be helpful in providing the reader with background information to facilitate a better understanding of the various aspects of the present embodiments. Accordingly, it should be understood that these statements are to be read in this light, and not as admissions of prior art.

In the following, image data refer to one or several arrays of samples (pixel values) in a specific image/video format which specifies all information relative to the pixel values of an image (or a video) and all information which may be used by a display and/or any other apparatus to visualize and/or decode an image (or video) for example. An image comprises a first component, in the shape of a first array of samples, usually representative of luminance (or luma) of the image, and a second and third component, in the shape of other arrays of samples, usually representative of the chrominance (or chroma) of the image. Or, equivalently, the same information may also be represented by a set of arrays of color samples, such as the traditional tri-chromatic RGB representation.

A pixel value is represented by a vector of C values, where C is the number of components. Each value of a vector is represented with a number of bits which defines a dynamic range of the pixel values.

Standard Dynamic Range images (SDR images) are images whose luminance values are represented with a limited number of bits (typically 8). This limited representation does not allow correct rendering of small signal variations, in particular in dark and bright luminance ranges. In High Dynamic Range images (HDR images), the signal representation is extended to maintain a high accuracy of the signal over its entire range. In HDR images, pixel values are usually represented in floating-point format (typically at least 10 bits per component, namely float or half-float), the most popular format being openEXR half-float format (16-bit per RGB component, i.e. 48 bits per pixel) or in integers with a long representation, typically at least 16 bits.

The advent of the High Efficiency Video Coding (HEVC) standard (*ITU-T H.265 Telecommunication standardization sector of ITU* (February 2018), *series H: audiovisual and multimedia systems, infrastructure of audiovisual services—coding of moving video, High efficiency video coding, Recommendation ITU-T H.265*) enables the deployment of new video services with enhanced viewing experience, such as Ultra HD services. In addition to an increased spatial resolution, Ultra HD format can bring a wider color gamut (WCG) and a higher dynamic range (HDR) than respectively the Standard Color Gamut (SCG) and the Standard Dynamic Range (SDR) of High Definition format currently deployed. Different solutions for the representation and coding of HDR/WCG video have been proposed such as the perceptual transfer function Perceptual Quantizer (PQ) (SMPTE ST 2084, "High Dynamic Range Electro-Optical Transfer Function of Mastering Reference Displays, or Diaz, R., Blinstein, S. and Qu, S. "Integrating HEVC Video Compression with a High Dynamic Range Video Pipeline", SMPTE Motion Imaging Journal, Vol. 125, Issue 1. February, 2016, pp 14-21). Typically, SMPTE ST 2084 allows to represent HDR video signal of up to 10 000 $cd/m^2$ peak luminance with only 10 or 12 bits.

SDR backward compatibility with decoding and rendering apparatus is an important feature in some video distribution systems, such as broadcasting or multicasting systems. A solution based on a single layer coding/decoding process may be backward compatible, e.g. SDR compatible, and may leverage legacy distribution networks and services already in place.

Such a single layer based distribution solution enables both high quality HDR rendering on HDR-enabled Consumer Electronic (CE) devices, while also offering high quality SDR rendering on SDR-enabled CE devices. Such a solution is based on an encoded signal, e.g. SDR signal, and associated metadata (few bytes per video frame or scene) that can be used to reconstruct another signal, e.g. either SDR or HDR signal, from a decoded signal.

An example of a single layer based distribution solution may be found in the ETSI technical specification TS 103 433-1 V1.2.1 (August 2017). Such a single layer based distribution solution is denoted SL-HDR1 in the following.

Additionally, HDR distribution systems (workflows but also decoding and rendering apparatus) may be already deployed. Indeed, there are a number of global video services providers which include HDR content. However, distributed HDR material may be represented in a format or with characteristics which do not match consumer end-device characteristics. Usually, the consumer end-device adapts the decoded material to its own characteristics. However, the versatility of technologies employed in the HDR TV begets important differences in terms of rendition because of the differences between the consumer end-device characteristics compared to the mastering display used in the production environment to grade the original content. For content producer, artistic intent fidelity and its rendition to the consumer are of utmost importance. Thus, "display adaptation" metadata generated either at the production stage during grading process or under the control of a quality check operator before emission enable the conveyance of the artistic intent to the consumer when the decoded signal is to be adapted to end-device characteristics.

An example of a single layer based distribution solution combined with display adaptation may be found in ETSI technical specification TS 103 433-2 V1.1.1 (January 2018). Such a single layer based distribution solution is denoted SL-HDR2 in the following.

Such single layer based distribution solution, SL-HDR1 or SL-HDR2, generates metadata as parameters used for the reconstruction of the signal. Metadata may be either static or dynamic.

Static metadata means parameters representative of the video content or its format that remain the same for a video (set of images) and/or a program.

Static metadata are valid for the whole video content (scene, movie, clip . . . ) and may depend on the image content per se or the representation format of the image content. They may define, for example, image format or color space, color gamut. For instance, SMPTE ST 2086: 2014, "Mastering Display Color Volume Metadata Supporting High Luminance and Wide Color Gamut Images" is such a kind of static metadata which describe the mastering display used to grade the material in a production environment. The Mastering Display Colour Volume (MDCV) SEI (Supplemental Enhanced Information) message is the distribution flavor of ST 2086 for both H.264/AVC ("*Advanced video coding for generic audiovisual Services*", SERIES H: AUDIOVISUAL AND MULTIMEDIA SYSTEMS, Recommendation ITU-T H.264, Telecommunication Standardization Sector of ITU, April 2017) and HEVC video codecs.

Dynamic metadata is content-dependent information, so that metadata could change with the image/video content, e.g. for each image or for each group of images. As an example, SMPTE ST 2094:2016 standards families, "Dynamic Metadata for Color Volume Transform" are dynamic metadata typically generated in a production environment. SMPTE ST 2094-30 can be distributed along HEVC and AVC coded video stream thanks to the Colour Remapping Information (CRI) SEI message.

Basically, a single layer based distribution solution comprises a format adaptation step to adapt the format of an input image (video) to the input of a pre-processing step intended to generate an output image (video) associated with metadata, an encoding step of said output image (video) and metadata, decoding steps of said output image (video) and metadata and a post-processing step intended to reconstruct an image (video) from said decoded output image (video) and, optionally, from said decoded metadata.

The post-processing step is usually implemented using integer rather than floating point values. Such integer implementation involve limitations of values of internal variables used in said post-processing step to maximal values that define precisions of these internal variables. However, it may happen that values of internal variables are clipped when the values of these internal variables exceeds said maximal values introducing losses of precision of these internal variables that introduce visual artifacts in the output image of said post-processing. Typically, in some SL-HDR1 or SL-HDR2 implementations, the internal chroma components precision has to be clipped to 9 bits (+ sign bit). When this clipping occurs, it introduces visual artifacts especially for very saturated red and blue colors.

3. SUMMARY

The following presents a simplified summary of the present embodiments in order to provide a basic understanding of some aspects of the present embodiments. This summary is not an extensive overview of the present embodiments. It is not intended to identify key or critical elements of the present embodiments. The following summary merely presents some aspects of the present embodiments in a simplified form as a prelude to the more detailed description provided below.

The present embodiments set out to remedy at least one of the drawbacks of the prior art with a method comprising obtaining chroma components representative of chroma components of an output image from color components representative of an input image, said output image being intended to be obtained by applying a decoding and a post-processing to an encoded image itself obtained by applying a pre-processing and encoding to said input image, said post-processing being equivalent to a functional inverse of said pre-processing; and if a value of a pixel in at least one of said chroma components exceeds a given value, modifying the value of said pixel in at least one of said color components in such a way that the value of said pixel in said at least one of said chroma components is lower than or equals to said given value.

According to an embodiment, the given value depends on a maximal integer value before clipping of the value of said pixel in at least one of said chroma components.

According to an embodiment, a value of said pixel in a first of said at least one chroma component is compared with a first given value and, a value of said pixel in a second of said at least one chroma component is compared with a second given value and said first and second given values are different values.

According to an embodiment, the value of said pixel in a single color component is modified.

According to an embodiment, the value of said pixel in at least one of said color components is modified by replacing the value of said pixel in the single color component by a value obtained when the value of said pixel in said chroma component chroma component lower than or equals to said given value.

According to an embodiment, a first value is obtained when the value of said pixel in a first chroma component equals to a first given value, a second value is obtained when the value of said pixel in a second chroma component equals to a second given value, then, a maximal value of said pixel is determined as being either said first value if said first value is greater than the second value or said second value otherwise, and the value of said pixel in at least one of said color components is modified by replacing the value of said pixel in the single color component by said maximal value.

According to an embodiment, wherein the value of said pixel in said single color component is replaced by said maximal value if said maximal value is strictly greater than 0 and strictly greater than the value of said pixel in said single color component.

According to an embodiment, said signal color component is considered as being a first color component, the value of said pixel in a second color component is also modified, said second color component being determined according to a first and a second values, said first value being obtained when the value of said pixel in a first chroma component equals to a first given value, and said second value being obtained when the value of said pixel in a second chroma component equals to a second given value.

According to an embodiment, the value of said pixel in the second color component is modified by multiplying said value of said pixel in said second color component by a ratio of a maximal value over the value of said pixel in the first color component, said maximal value of said pixel being determined as being either said first value if said first value is greater than the second value or said second value otherwise.

According to an embodiment, the value of said pixel in the second color component is modified only if said maximal value is greater than a given value.

According to an embodiment, the value of said pixel in the second color component is modified only if the value of said pixel in the input image is lower than the value of said pixel in the first color component.

According to another of their aspects, the present embodiments relate to a computer program product comprising program code instructions to execute the steps of the above methods when this program is executed on a computer.

According to another of their aspects, the present embodiments relate to a non-transitory processor-readable medium whose program code instructions to execute the steps of the above methods when this program is executed on a computer.

The specific nature of the present embodiments as well as other objects, advantages, features and uses of the present embodiments will become evident from the following description of examples taken in conjunction with the accompanying drawings.

4. BRIEF DESCRIPTION OF DRAWINGS

In the drawings, examples of the present embodiments are illustrated. It shows:

Similar or same elements are referenced with the same reference numbers.

5. DESCRIPTION OF EXAMPLE OF THE PRESENT EMBODIMENTS

Figure 5:
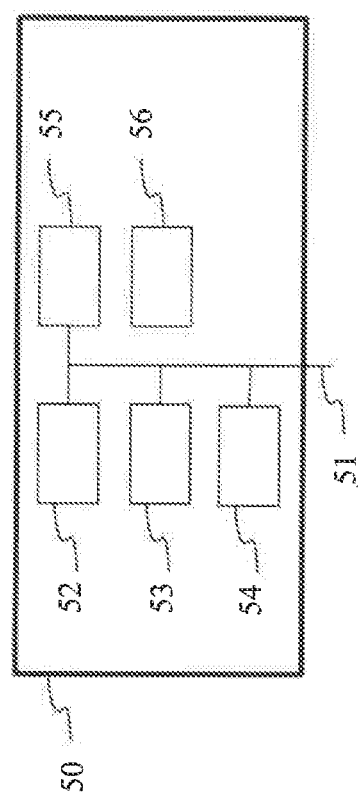
FIG. 5 represents an exemplary embodiment of an architecture of a apparatus which may be configured to implement a method described in relation with FIG. 1 to FIG. 4c.

The present embodiments will be described more fully hereinafter with reference to the accompanying figures, in which examples of the present embodiments are shown. The present embodiments may, however, be embodied in many alternate forms and should not be construed as limited to the examples set forth herein. Accordingly, while the present embodiments are susceptible to various modifications and alternative forms, specific examples thereof are shown by way of examples in the drawings and will herein be described in detail. It should be understood, however, that there is no intent to limit the present embodiments to the particular forms disclosed, but on the contrary, the disclosure is to cover all modifications, equivalents, and alternatives falling within the spirit and scope of the present embodiments as defined by the claims.

The terminology used herein is for the purpose of describing particular examples only and is not intended to be limiting of the present embodiments. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/". It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present embodiments. Although some of the diagrams include arrows on communication paths to show a primary direction of communication, it is to be understood that communication may occur in the opposite direction to the depicted arrows. Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved. Reference herein to "in accordance with an example" or "in an example" means that a particular feature, structure, or characteristic described in connection with the example can be included in at least one implementation of the present embodiments. The appearances of the expression "in accordance with an example" or "in an example" in various places in the specification are not necessarily all referring to the same example, nor are separate or alternative examples necessarily mutually exclusive of other examples. Reference numerals appearing in the claims are by way of illustration only and shall have no limiting effect on the scope of the claims. While not explicitly described, the present examples and variants may be employed in any combination or sub-combination.

Typically, two different images have different dynamic range of the luminance. The dynamic range of the luminance of an image is the ratio between the maximum over the minimum of the luminance values of said image.

Typically, when the dynamic range of the luminance of an image is below 1000 (e.g. 500: 100 cd/m2 over 0.2 cd/m2), said image is denoted as a Standard Dynamic Range (SDR) image and when the dynamic range of the luminance of an image is equal or greater than 1000 (e.g. 10000: 1000 cd/m2 over 0.1 cd/m2) said image is denoted as an HDR image. Luminance is expressed by the unit candela per square meter ($cd/m^2$). This unit supersedes the term "nit" which may also be used (although it is deprecated in the International System of Units).

The present embodiments are described for pre-processing, encoding, decoding and post-processing an image but extends to pre-processing, encoding, decoding and post-processing and a sequence of images (video) because each image of the sequence is sequentially pre-processed, encoded, decoded and post-processed as described below.

In the following, a component $C_n^m$ designates a component m of an image n. These components $\{C_n^m\}$ with m=1, 2, 3, represent an image $I_n$ in a specific image format.

Typically, an image format is characterized by a color volume (e.g. chromaticity and dynamic range), a color encoding system (e.g. RGB, YCbCr . . . ) . . . .

Figure 1:
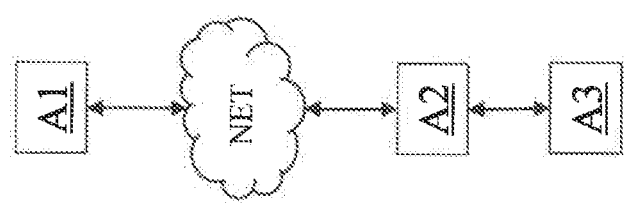
FIG. 1 shows a high-level representation of an end-to-end workflow supporting content delivery to display with improved display adaptation feature in accordance with an example of the present embodiments.

FIG. 1 shows a high-level representation of an end-to-end workflow supporting content delivery to display with improved display adaptation feature in accordance with an example of the present embodiments. The apparatus A1 is configured to implement a method for pre-processing and encoding an image or a video stream, the apparatus A2 is configured to implement a method for decoding and post-processing an image or video stream as described below, and the apparatus A3 is configured to display the decoded and post-processed image or video stream. The two remote apparatuses A1 and A2 are communicating over a distribution network NET that is configured at least to provide the encoded image or video stream from apparatus A1 to apparatus A2.

Apparatus A1 comprises at least one device configured to implement a pre-processing and/or encoding method as described herebelow. Said at least one device belongs to a set of devices comprising a mobile device, a communication device, a game device, a tablet (or tablet computer), a computer device such as a laptop, a still image camera, a video camera, an encoding chip, a still image server and a video server (e.g. a broadcast server, a video-on-demand server or a web server).

Apparatus A2 comprises at least one device configured to implement a decoding and/or post-processing method as described herebelow. Said at least one device belongs to a set of devices comprising a mobile device, a communication device, a game device, a computer device and a set top box.

Apparatus A3 comprises at least one device configured to implement a displaying method. Said at least one device belongs to a set of devices comprising a TV set (or television), a tablet (or tablet computer), a computer device such as a laptop, a display, a head-mounted display and a rendering/displaying chip.

In accordance with an example, the network is a broadcast network, adapted to broadcast still images or video images from apparatus A1 to a plurality of apparatuses A2. DVB and ATSC based networks are examples of such broadcast networks.

In accordance with another example, the network is a broadband network adapted to deliver still images or video images from apparatus A1 to a plurality of apparatuses A2. Internet-based networks, GSM networks or TV over IP networks are examples of such broadband networks.

In an exemplary embodiment, the end-to-end workflow uses a broadcast server for apparatus A1, a set top box for apparatus A2, a television set for apparatus A3 and a DVB terrestrial broadcast network.

In an alternate embodiment, apparatus A2 and A3 are combined in a single device, for example a television integrating set top box decoding and post-processing functionalities.

In an alternate embodiment, the distribution network NET is replaced by a physical packaged media on which the encoded image or video stream is stored.

Physical packaged media comprise optical packaged media such a Blu-ray disc and Ultra HD Blu-ray but also memory-based package media such as used in OTT and VoD services.

Figure 2:
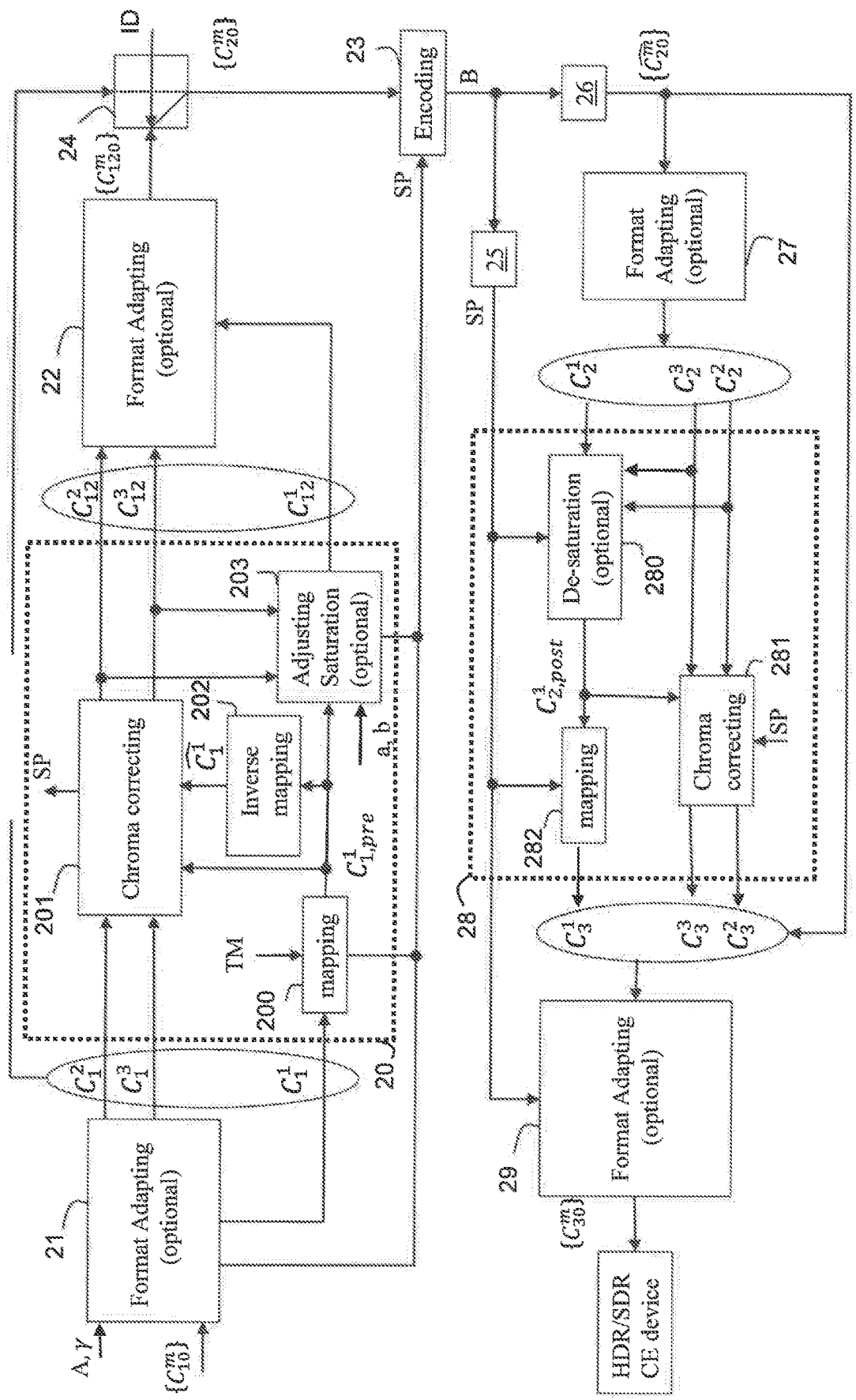
FIG. 2 shows an example of an end-to-end processing workflow supporting delivery to HDR and SDR CE displays in accordance with a single layer based distribution solution.

FIG. 2 shows an example of an end-to-end processing workflow supporting delivery to HDR and SDR CE displays in accordance with a single layer based distribution solution.

Basically, said single layer based distribution solution may address SDR direct backward compatibility i.e. it leverages SDR distribution networks and services already in place and enables high quality HDR rendering on HDR-enabled CE devices including high quality SDR rendering on SDR CE devices.

SL-HDR1 is one example of such single layer based distribution solution.

But, said single based layer distribution solution may also relate to a solution used on distribution networks for which display adaptation dynamic metadata are delivered along with an PQ HDR video signal. PQ means "Perceptual Quantization" as specified in Rec. ITU-R BT.2100 "Recommendation ITU-R BT.2100-1, Image parameter values for high dynamic range television for use in production and international programme exchange".

The workflow shown in FIG. 2 involves a single layer-based distribution solution with associated metadata and illustrates an example of the use of a method for reconstructing three components $\{C_{30}{}^m\}$ representative of three components $\{C_{10}{}^m\}$ of an input image from three decoded components $\{\tilde{c}_{20}^m\}$ representative of a decoded image and said metadata as specified, for example, in SL-HDR1 or SL-HDR2.

An information data ID determines which single layer based distribution solution has to be considered. Usually, in practice only one single based layer distribution solution is instantiated and the information data ID is a fixed value. If more than one single layer based distribution solutions are instantiated, then the information data ID indicates which of these single layer based distribution solutions has to be considered.

Typically, SL-HDR1 and SL-HDR2 may be instantiated and the information data ID indicates if either SL-HDR1 or SL-HDR2 has to be considered.

Basically, the single layer based distribution solution shown in FIG. 2 comprises a pre-processing step 20, an encoding step 23, decoding steps 25 and 26 and a post-processing step 28.

The input and the output of the pre-processing step 20 are triplets of components $\{C_1{}^m\}$ and $\{C_{12}{}^m\}$ respectively, and the input and the output of the post-processing step 28 are triplets of components $\{C_2{}^m\}$ and $\{C_3{}^m\}$ respectively.

The single layer based distribution solution shown in FIG. 2 may comprise optional format adaptations steps 21, 22, 27, 29 to adapt the format of three components $\{C_n{}^m\}$ to the input of a further processing to be applied on these components.

For example, in step 21 (optional), the format of the three components $\{C_{10}{}^m\}$ may be adapted to a format fitting an input format of the pre-processing step 20 or an input format of an encoding step 23, and in step 22 (optional), the format of the three components $\{C_{12}{}^m\}$ may also be adapted to a format fitting the input format of the encoding step 23.

In step 27, (optional) the format of the three components $\{\tilde{c}_{20}^m\}$ may be adapted to a format fitting the input of the post-processing step 28, and in step 29, the format of the three components $\{C_3{}^m\}$ may be adapted to a format that may be defined from at least one characteristic of a targeted apparatus (e.g. a Set-Top-Box, a connected TV, HDR/SDR enabled CE device, an Ultra HD Blu-ray disc player).

Said format adaptation steps (21, 22, 27, 29) may include color space conversion and/or color gamut mapping (and/or inverse color gamut mapping). Inverse gamut mapping may be used, for example, when the three decoded components $\{\tilde{c}_{20}^m\}$ and the three components $\{C_{30}{}^m\}$ of an output image or the three components $\{C_{10}{}^m\}$ of an input image are represented in different color spaces and/or gamut.

Usual format adapting processes may be used such as R'G'B'-to-Y'CbCr or Y'CbCr-to-R'G'B' conversions, BT.709-to-BT.2020 or BT.2020-to-BT.709, down-sampling or up-sampling chroma components, etc.

For example, SL-HDR1 may use format adapting processes and inverse gamut mapping as specified in Annex D of the ETSI technical specification TS 103 433-1 V1.2.1 (August 2017).

Said input format adaptation step 21 may also include adapting the bit depth of the three components $\{C_{10}{}^m\}$ to bit depth such as 10 bits for example, by applying a transfer function on the three components $\{C_{10}{}^m\}$ such as a PQ or HLG transfer function or its inverse (Rec. ITU-R BT.2100).

In the pre-processing step 20, the three components $\{C_1{}^m\}$ (equal either to the three components $\{C_{10}{}^m\}$ when the format has not been adapted in step 21 or to adapted versions of these three components $\{C_{10}{}^m\}$ when the format of these components has been adapted in step 21) are decomposed into three components $\{C_{12}{}^m\}$ (which format may have been possibly adapted during step 22 to get the three components $\{C_{120}{}^m\}$) and a set of parameters SP, and a switching step 24 determines if the three components $\{C_{20}{}^m\}$ equals either the three components $\{C_{120}{}^m\}$ or the three components $\{C_1{}^m\}$.

In step 23, the three components $\{C_{20}{}^m\}$ may be encoded with any video codec and a signal comprising the bitstream B is carried throughout a distribution network.

According to variant of step 23, the set of parameters SP and/or the information data ID are conveyed as associated static and/or dynamic metadata in the bitstream B.

According to a variant, the set of parameters SP and/or the information data ID are conveyed as associated static and/or dynamic metadata on a specific channel.

Then, at least one signal, intended to be decoded by the apparatus A2 of FIG. 1, carries the bitstream B and the accompanying metadata.

In a variant, the bitstream B is stored on a storage medium such as a Blu-ray disk or a hard disk or a memory of a Set-Top-Box for example.

In a variant, at least some accompanying associated metadata is stored on a storage medium such as an UltraHD Blu-ray disk or a hard disk or a memory of a Set-Top-Box for example.

Preferably, in step 23, a sequence of at least one triplet of components $\{C_{20}{}^m\}$, each representing an image, and possibly associated metadata are encoded with a video codec such as the H.265/HEVC codec or H.264/AVC.

In step 25, the set of parameters SP is obtained at least partially either from the bitstream B or from another specific channel. At least one of parameters of the set of parameters SP may also be obtained from a separate storage medium.

In step 26, the three decoded components $\{\widehat{C_{20}^m}\}$ are obtained from the bitstream B.

In the post-processing step 28, which is a nearby functional inverse of the pre-processing step 20, the three components $\{C_{30}{}^m\}$ are reconstructed from the three decoded components $\{\widehat{C_{20}^m}\}$ and the obtained set of parameters SP.

In more details, the pre-processing step 20 comprises steps 200-203.

In step 200, a component $C_{1,pre}{}^1$ is obtained by applying a mapping function on the component $C_1{}^1$ of the three components $\{C_1{}^m\}$. Said component $C_1{}^1$ represents the luminance of the input image.

Mathematically speaking, $$C_{1,pre}{}^1 = MF(C_1{}^1) \quad (1)$$

with MF being a mapping function that may reduce or increase the dynamic range of the luminance of an image. Note that its inverse, denoted IMF, may inversely increase or reduce the dynamic range of the luminance of an image.

In step 202, a reconstructed component $\widehat{c_1^1}$ is obtained by applying an inverse-mapping function on the component $C_{1,pre}{}^1$:

$$\widehat{c_1^1} = IMF(C_{1,pre}{}^1) \quad (2)$$

where IMF is the functional inverse of the mapping function MF. The values of the reconstructed component $\widehat{c_1^1}$ belong thus to the dynamic range of the values of the component $C_1{}^1$.

In step 201, the components $C_{12}{}^2$ and $C_{12}{}^3$ are derived by correcting the components $C_1{}^2$ and $C_1{}^3$ representing the chroma of the input image according to the component $C_{1,pre}{}^1$ and the reconstructed component $\widehat{c_1^1}$.

This step 201 allows to control the colors obtained from the three components $\{C_{12}{}^m\}$ and guarantees their perceptual matching to the colors of the input image. The correction of the components $C_1{}^2$ and $C_1{}^3$ (usually denoted chroma components) may be maintained under control by tuning the parameters of the chroma correcting and inverse mapping steps. The color saturation and hue obtained from the three components $\{C_{12}{}^m\}$ are thus under control. Such a control is not possible, usually, when a non-parametric mapping function (step 200) is used.

Optionally, in step 203, the component $C_{1,pre}{}^1$ may be adjusted to further control the perceived saturation, as follows:

$$C_{12}{}^1 = C_{1,pre}{}^1 - \max(0, a \cdot C_{12}{}^2 + b \cdot C_{12}{}^3) \quad (3)$$

where a and b are two parameters.

This step 203 allows to control the luminance (represented by the component $C_{12}{}^1$) to guarantee the perceived color matching between the colors (saturation and hue) obtained from the three components $\{C_{12}{}^m\}$ and the colors of the input image.

The set of parameters SP may comprise information data relative to the mapping function or its inverse (steps 200, 202 and 282), information data relative to the chroma correcting (steps 201 and 281), information relative to the saturation adjusting function, in particular their parameters a and b (step 203), and information relative to the optional conversion used in the format adapting stages 21, 22, 27, 29 (e.g. gamut mapping and/or inverse gammping parameters).

Figure 3:
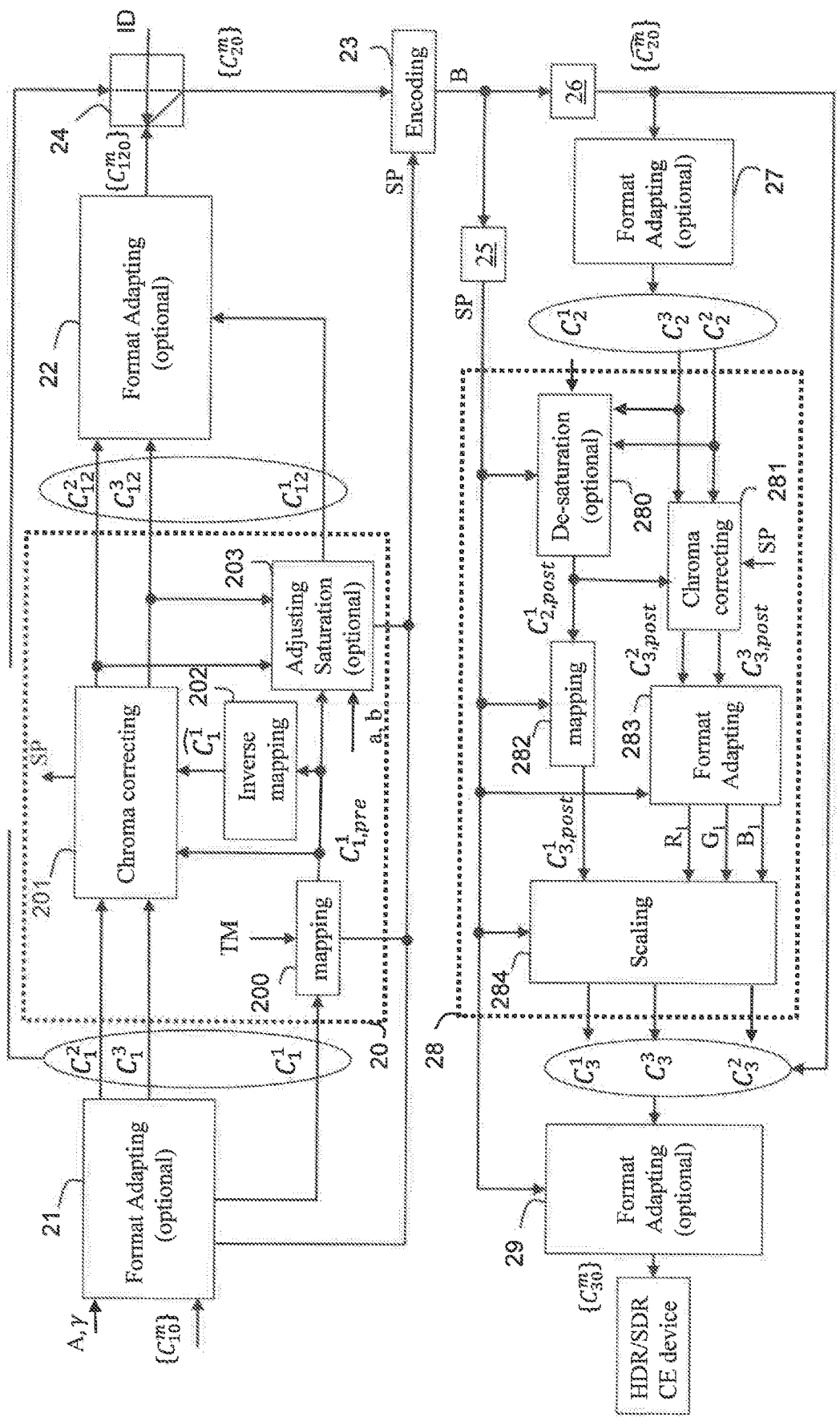
FIG. 3 shows a particular implementation of the workflow of FIG. 2.

The set of parameters SP may also comprise the information data ID and information characteristics of the output image, e.g. the format of the three components $\{C_{30}{}^m\}$ representative of said output image (steps 29 of FIGS. 2 and 3, 284 of FIG. 3).

In more details, the post-processing step 28 comprises steps 280-282 which take as input at least one parameter of the set of parameters SP.

In optional step 280, the component $C_2{}^1$ of the three components $\{C_2{}^m\}$, output of step 27, may be adjusted as follows:

$$C_{2,post}{}^1 = C_2{}^1 + \max(0, a \cdot C_2{}^2 + b \cdot C_2{}^3) \quad (4)$$

where a and b are two parameters of the set of parameters SP.

For example, the step 280 is executed when the information data ID indicates that SL-HDR1 has to be considered and not executed when it indicates that SL-HDR2 has to be considered.

In step 282, the component $C_3{}^1$ of the three components $\{C_3{}^m\}$ is obtained by applying a mapping function on the component $C_2{}^1$ or, optionally, $C_{2,post}{}^1$:

$$C_3{}^1 = MF1(C_{2,post}{}^1) \quad (5)$$

where MF1 is a mapping function derived from at least one parameter of the set of parameters SP.

In step 281, the components a $C_3^2$, $C_3^3$ of the three components $\{C_3^m\}$ are derived by inverse correcting the components $C_2^2$, $C_2^3$ of the three components $\{C_2^m\}$ according to the component $C_2^1$ or, optionally, $C_{2,post}^1$.

According to an embodiment, the components $C_2^2$ and $C_2^3$ are multiplied by a chroma correcting function $\beta(\cdot)$ as defined by parameters of the set of parameters SP and whose value depends on the component $C_2^1$ or, optionally, $C_{2,post}^1$.

Mathematically speaking, the components $C_3^2$, $C_3^3$ are given by:

$$\begin{bmatrix} C_3^2 \\ C_3^3 \end{bmatrix} = \beta(C_2^1) \begin{bmatrix} C_2^2 \\ C_2^3 \end{bmatrix} \tag{6}$$

https://patentlicensingtechnicolor.com/IPTech/home/ or optionally, $$\begin{bmatrix} C_3^2 \\ C_3^3 \end{bmatrix} = \beta(C_{2,post}^1) \begin{bmatrix} C_2^2 \\ C_2^3 \end{bmatrix} \tag{6bis}$$

FIG. 3 represents a hardware-friendly optimization of single layer-based solution of FIG. 2. Said optimization includes two additional steps 283 and 284 and allows to reduce complexity for hardware implementation by reducing buses bitwidth use.

In step 283, three components denoted $(R_1, G_1, B_1)$ are obtained from components $C_{3,post}^2$ and $C_{3,post}^3$, outputs of the step 281, by taking into account parameters of the set of parameters SP:

$$\begin{bmatrix} R_1 \\ G_1 \\ B_1 \end{bmatrix} = \begin{bmatrix} 1 & 0 & m_0 \\ 1 & m_1 & m_2 \\ 1 & m_3 & 0 \end{bmatrix} \times \begin{bmatrix} S_0 \\ C_{3,post}^2 \\ C_{3,post}^3 \end{bmatrix}$$

where $m_0$, $m_1$, $m_2$, $m_3$ are parameters of the set of parameters SP and $S_0$ is derived from the components $C_{3,post}^2$ and $C_{3,post}^3$ and other parameters of the set of parameters SP.

In step 284, the tree components $\{C_3^m\}$ are then obtained by scaling the three components $(R_1, G_1, B_1)$ according to a component $C_{3,post}^1$, output of step 282.

$$\begin{cases} C_3^1 = C_{3,post}^1 \times R_1 \\ C_3^2 = C_{3,post}^1 \times G_1 \\ C_3^3 = C_{3,post}^1 \times B_1 \end{cases} \tag{7}$$

where $C_{3,post}^1 = MF1(C_{2,post}^1)$ (step 282).

According to a first exemplary embodiment of the end-to-end workflow of FIG. 2 or FIG. 3, the information data ID indicates that SL-HDR1 has to be considered.

The mapping function MF($\cdot$) in eq. (1) then reduces the dynamic range of the luminance of the input image, its inverse IMF($\cdot$) in eq. (2) increases the dynamic range of the component $C_{1,pre}^1$ and the mapping function MF1($\cdot$) in eq. (5) increases the dynamic range of the component $C_{2,post}^1$.

According to a first variant of said first exemplary embodiment, the component $C_1^1$ is a non-linear signal, denoted luma in literature, which is obtained (step 21) from the gamma-compressed RGB components of the input image by:

$$C_1^1 = A_1 \begin{bmatrix} R^{1/\gamma} \\ G^{1/\gamma} \\ B^{1/\gamma} \end{bmatrix} \tag{8}$$

where $\gamma$ may be a gamma factor, preferably equal to 2.4.

Next, according to said first variant, the component $C_1^2$, $C_1^3$ are then obtained (step 21), by applying a gamma compression to the RGB components of the input image:

$$\begin{bmatrix} C_1^2 \\ C_1^3 \end{bmatrix} = \begin{bmatrix} A_2 \\ A_3 \end{bmatrix} \begin{bmatrix} R^{1/\gamma} \\ G^{1/\gamma} \\ B^{1/\gamma} \end{bmatrix} \tag{9}$$

where $A=[A_1 \, A_2 \, A_3]^T$ being the canonical 3×3 R'G'B'-to-Y'CbCr conversion matrix (e.g. Recommendation ITU-R BT.2020-2 or Recommendation ITU-R BT.709-6 depending on the color space), $A_1$, $A_2$, $A_3$ being 1×3 matrices where $A_1 = [A_{11} A_{12} A_{13}]$ $A_2 = [A_{21} A_{22} A_{23}]$ $A_3 = [A_{31} A_{32} A_{33}]$ where $A_{mn}$ (m=1, ..., 3, n=1, ... 3) are matrix coefficients.

Next, in step 201, according to said first variant, the components $C_1^2$ and $C_1^3$ are corrected from the ratio between the component $C_{1,pre}^1$ over the product of the gamma-compressed reconstructed component $\widehat{c_1^1}$ by $\Omega(C_{1,pre}^1)$:

$$\begin{bmatrix} C_{12}^2 \\ C_{12}^3 \end{bmatrix} = \frac{c_{1,pre}^1}{\Omega(c_{1,pre}^1)\widehat{c_1^1}^{\frac{1}{\gamma}}} \cdot \begin{bmatrix} C_1^2 \\ C_1^3 \end{bmatrix} \tag{10}$$

where $\Omega(C_{1,pre}^1)$ is a value that depends on the component $C_{1,pre}^1$ but may also be a constant value depending on the color primaries of the three components $\{C_1^m\}$. $\Omega(C_{1,pre}^1)$ may equal to 1.2 for Rec. BT.2020 for example. Possibly, $\Omega(C_{1,pre}^1)$ may also depend on parameters as specified in ETSI TS 103 433-1 V.1.2.1 clause C.2.3. $\Omega(C_{1,pre}^1)$ may also be a parameter of the set of parameters SP.

Finally, according to said first variant, the three components $\{C_{120}^m\}$ may then represent a Y'CbCr 4:2:0 gamma transfer characteristics video signal.

For example, the control parameters relative to the mapping function MF and/or its inverse IMF and/or the mapping function MF1($\cdot$) may be determined as specified in Clause C.3.2 (ETSI technical specification TS 103 433-1 V1.2.1). The chroma correcting function $\beta(\cdot)$ and their parameters may be determined as specified in Clause C.2.3 and C.3.4 (ETSI technical specification TS 103 433-1 V1.2.1). Information data relative to the control parameters relative to the mapping functions or their inverse and information data relative to the chroma correcting function $\beta(\cdot)$ and their parameters are parameters of the set of parameters SP. Examples of numerical values of the parameters of the set of parameters SP may be found, for example, in Annex F (Table F.1) (ETSI technical specification TS 103 433-1 V1.2.1.

The parameters $m_0, m_1, m_2, m_3$ and $S_0$ may be determined as specified in Clause 6.3.2.6 (matrixCoefficient[i] are defining $m_0, m_1, m_2, m_3$) and Clause 6.3.2.8 (kCoefficient[i] are used to construct $S_0$) of ETSI technical specification TS 103 433-1 V1.2.1 and their use for reconstruction may be determined as specified in Clause 7.2.4 (ETSI technical specification TS 103 433-1 V1.2.1).

According to a second variant of said first exemplary embodiment, the component $C_1^1$ is a linear-light luminance component L obtained from the RGB component of the input image $I_1$ by:

$$C_1^1 = L = A_1 \begin{bmatrix} R \\ G \\ B \end{bmatrix} \quad (11)$$

Next, according to said second variant, the component $C_1^2, C_1^3$ are then derived (step 21) by applying a gamma compression to the RGB components of the input image $I_1$:

$$\begin{bmatrix} C_1^2 \\ C_1^3 \end{bmatrix} = \begin{bmatrix} A_2 \\ A_3 \end{bmatrix} \begin{bmatrix} R^{1/\gamma} \\ G^{1/\gamma} \\ B^{1/\gamma} \end{bmatrix} \quad (12)$$

Next, according to said second variant, the component $C_{12}^2, C_{12}^3$ are then derived (step 201) by correcting the components $C_1^2, C_1^3$ from the ratio between the first component $C_{1,pre}^1$ over the product of the gamma-compressed reconstructed component $\widehat{c_1^1}$ by $\Omega(C_{1,pre}^1)$.

$$\begin{bmatrix} C_{12}^2 \\ C_{12}^3 \end{bmatrix} = \frac{c_{1,pre}^1}{\Omega(c_{1,pre}^1)\widehat{c_1^1}^{1/\gamma}} \begin{bmatrix} C_1^2 \\ C_1^3 \end{bmatrix} \quad (13)$$

where $\Omega(C_{1,pre}^1)$ is a value that depends on the component $C_{1,pre}^1$ and, is possibly, obtained from parameters as specified in ETSI TS 103 433-1 V.1.2.1 clause C.3.4.2 where $$\Omega(C_{1,pre}^1) \frac{1}{\text{Max}(R_{sgf}: 255; R_{sgf}.g(Y_n))}$$

in equation (22).

$\Omega(C_{1,pre}^1)$ may also be a parameter of the set of parameters SP.

Finally, according to said second variant, the three components $\{C_{120}^m\}$ may then represent a Y'CbCr 4:2:0 gamma transfer characteristics video signal.

For example, the control parameters relative to the mapping function MF and/or its inverse IMF and/or the mapping function MF1(•) may be determined as specified in Clause C.3.2 (ETSI technical specification TS 103 433-1 V1.2.1). The chroma correcting function pc) and their parameters may be determined as specified in Clause 7.2.3.2 (ETSI technical specification TS 103 433-2 V1.1.1) eq. (25) where $f_{sgf}(Y_n)=1$. Information data relative to the control parameters relative to the mapping functions or their inverse and information data relative to the chroma correcting function β(•) and their parameters are parameters of the set of parameters SP.

The parameters $m_0, m_1, m_2, m_3$ and $S_0$ may be determined as specified in Clause 6.3.2.6 (matrixCoefficient[i] are defining $m_0, m_1, m_2, m_3$) and Clause 6.3.2.8 (kCoefficient[i] are used to construct $S_0$) of ETSI technical specification TS 103 433-1 V1.2.1 and their use for reconstruction may be determined as specified in Clause 7.2.4 (ETSI technical specification TS 103 433-1 V1.2.1).

According to a second exemplary embodiment of the end-to-end workflow of FIG. 2 or FIG. 3, the information data ID indicates that SL-HDR2 has to be considered.

The three components $\{C_1^m\}$ may then be represented as a Y'CbCr 4:4:4 full range PQ10 (PQ 10 bits) video signal (specified in Rec. ITU-R BT.2100). The three components $\{C_{20}^m\}$, which is an PQ 10-bits image data and associated parameter computed from the three components $\{C_1^m\}$ (typically 10, 12 or 16 bits) are provided, and then encoded (step 23) using, for example an HEVC Main 10 profile encoding scheme. Those parameters are set to the set of parameters SP.

The mapping function MF1(•) in eq. (5) may increase or reduce the dynamic range of the component $C_{2,post}^1$ according to variants.

For example, the mapping function MF1(•) increases the dynamic range when the peak luminance of the connected HDR CE displays is above the peak luminance of the content. The mapping function MF1(•) decreases the dynamic range when the peak luminance of the connected HDR or SDR CE displays is below the peak luminance of the content. For example, said peak luminances may be parameters of the set of parameters SP.

For example, the control parameters relative to the mapping function MF1 may be determined as specified in Clause C.3.2 (ETSI technical specification TS 103 433-1 V1.2.1). The chroma correcting function pc) and their parameters may be determined as specified in Clause 7.2.3.2 (ETSI technical specification TS 103 433-2 V1.1.1) eq. (25) where $f_{sgf}(Y_n)=1$. Information data relative to the control parameters relative to the mapping function and information data relative to the chroma correcting function pc) and their parameters are parameters of the set of parameters SP. Examples of numerical values of the parameters of the set of parameters SP may be found, for example, in Annex F (Table F.1) (ETSI technical specification TS 103 433-2 V1.1.1).

The parameters $m_0, m_1, m_2, m_3$ (defined by matrixCoefficient[i] in ETSI technical specification TS 103 433-2 V1.1.1) and $S_0$ (constructed with kCoefficient[i] in ETSI technical specification TS 103 433-2 V1.1.1) may be determined as specified in Clause 7.2.4 (ETSI technical specification TS 103 433-2 V1.1.1).

According to a first variant of said second exemplary embodiment, the three components $\{C_{30}^m\}$ representative of said output image are the three components $\{\widehat{c_{20}^m}\}$.

According to a second variant of said second exemplary embodiment, in the post-processing step 28, the three components $\{C_3^m\}$ are reconstructed from the three components $\{\widehat{c_{20}^m}\}$ and parameters of the set of parameters SP after decoding (step 25).

The three components $\{C_3^m\}$ are then available for either an SDR or HDR enabled CE display. The format of the three components $\{C_3^m\}$ are possibly adapted (step 29) as explained above.

The mapping function MF(•) or MF1(•) is based on a perceptual transfer function, whose goal is to convert a component of an input image into a component of an output image, thus reducing (or increasing) the dynamic range of the values of their luminance. The values of a component of the output image belong thus to a lower (or greater) dynamic range than the values of the component of an input image. Said perceptual transfer function uses a limited set of control parameters.

Figure 4A:
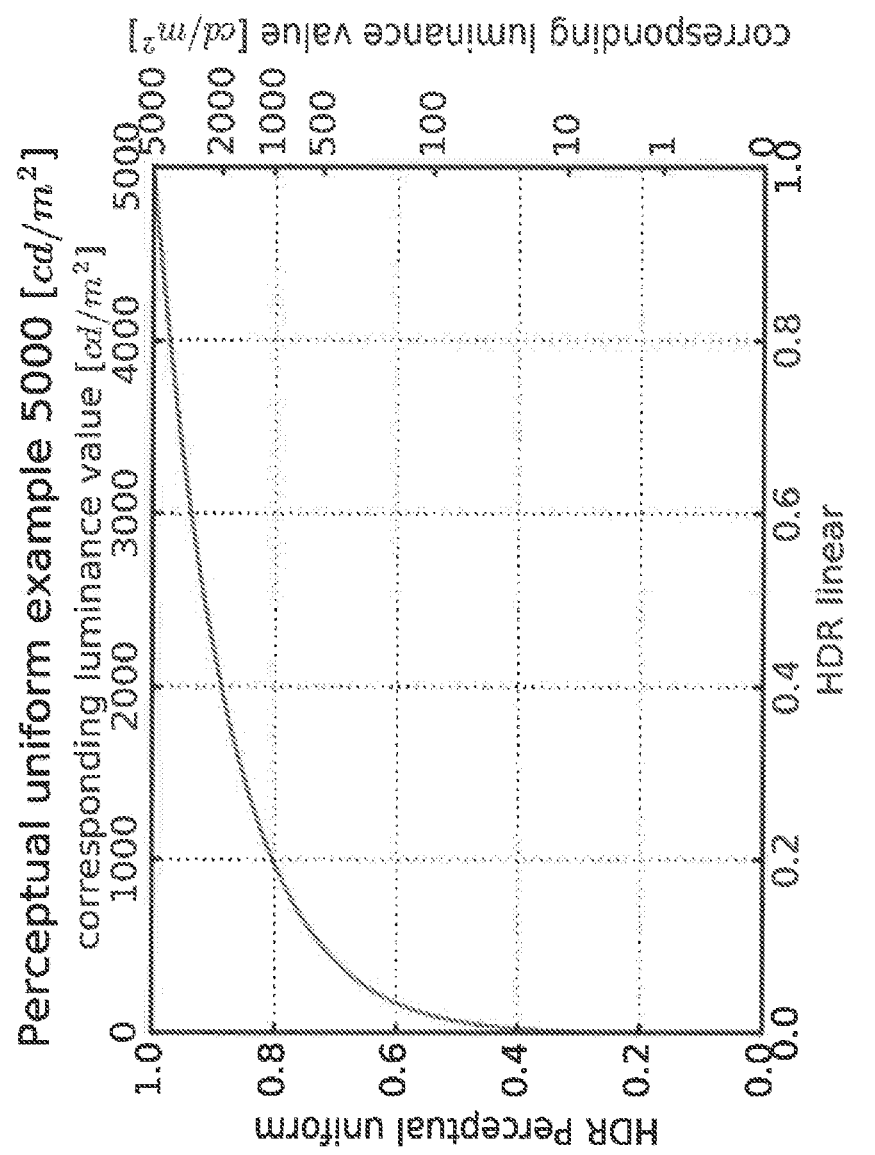
FIG. 4a shows an illustration of a perceptual transfer function.
Figure 4B:
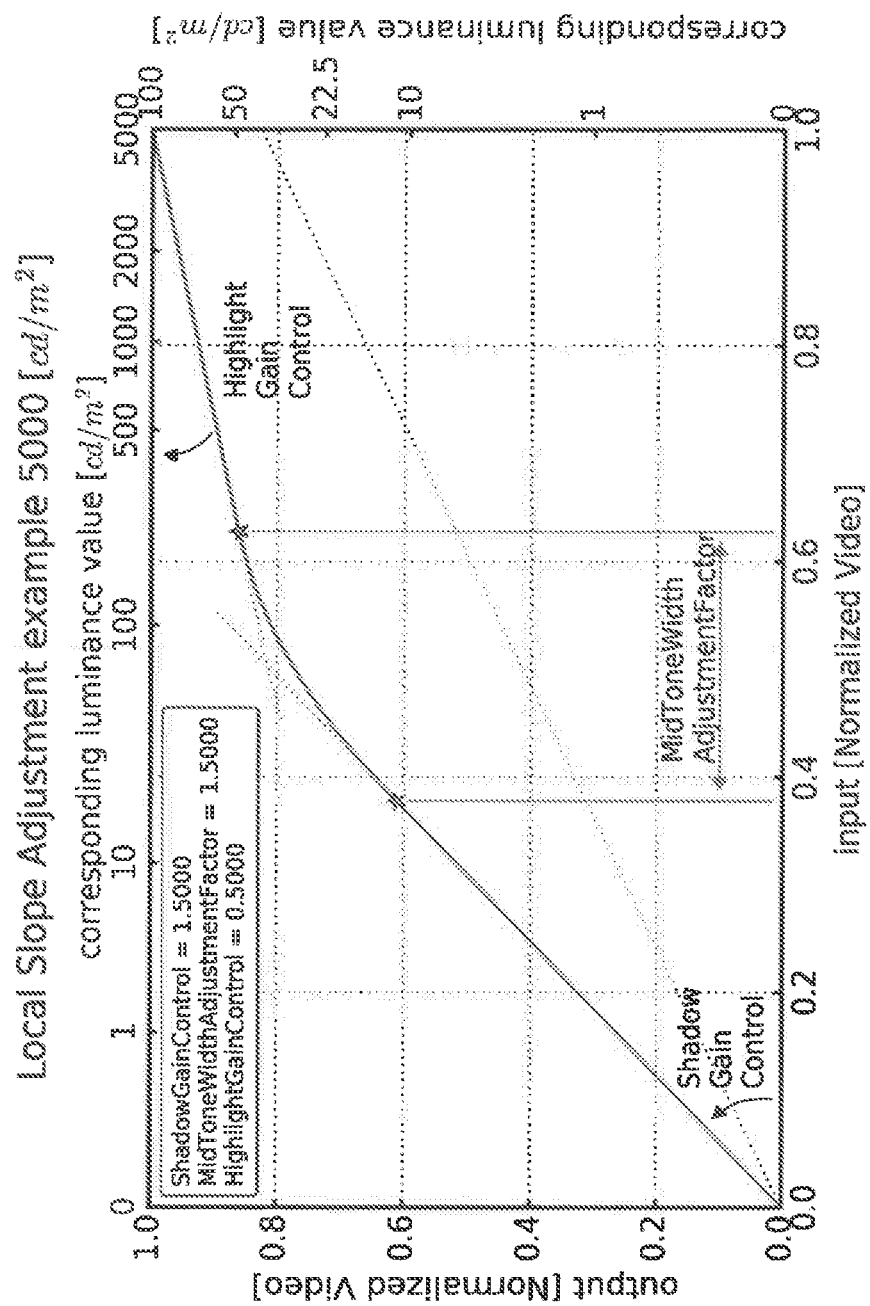
FIG. 4b shows an example of a piece-wise curve used for mapping.

FIG. 4a shows an illustration of a perceptual transfer function which may be used for mapping luminance components but a similar perceptual transfer function for mapping the luminance component may be used. The mapping is controlled by a mastering display peak luminance parameter (equal to 5000 cd/m² in FIG. 4a). To better control the black and white levels, a signal stretching between content-dependent black and white levels is applied. Then the converted signal is mapped using a piece-wise curve constructed out of three parts, as illustrated in FIG. 4b. The lower and upper sections are linear, the steepness being determined by the shadowGain control and highlightGain control parameters respectively. The mid-section is a parabola providing a continuous and smooth bridge between the two linear sections. The width of the cross-over is determined by the midToneWidthAdjFactor parameter. All the parameters controlling the mapping may be conveyed as metadata for example by using a SEI message as specified in ETSI TS 103 433-1 Annex A.2 metadata.

Figure 4C:
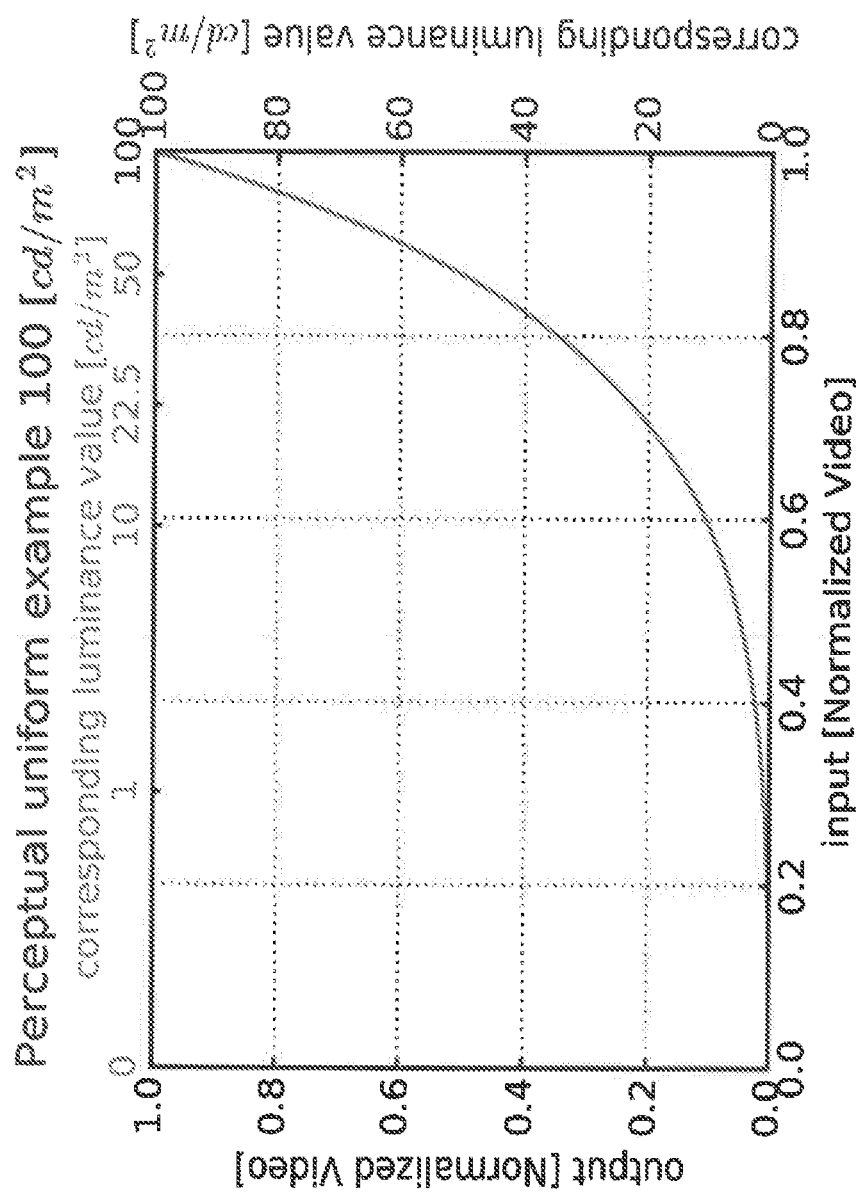
FIG. 4c shows an example of a curve used for converting back a perceptual uniform signal to a linear-light domain.

FIG. 4c shows an example of the inverse of the perceptual transfer function TM (FIG. 4a) to illustrate how a perceptually optimized luminance signal may be converted back to the linear-light domain based on a targeted legacy display maximum luminance, for example 100 cd/m2.

In step 25 (FIG. 2 or 3), the set of parameters SP is obtained to reconstruct the tree components $\{C_3^m\}$ from the tree components $\{\tilde{C}_{20}^m\}$. These parameters may be obtained from metadata obtained from a bitstream, for example the bitstream B.

ETSI TS 103 433-1 V1.2.1 clause 6 and Annex A.2 provide an example of syntax of said metadata. The syntax of this ETSI recommendation is described for reconstructing an HDR video from an SDR video but this syntax may extend to the reconstruction of any image from any decoded components; as an example, TS 103 433-2 V1.1.1 uses the same syntax for reconstructing a display adapted HDR video from an HDR video signal (with a different dynamic range).

According to ETSI TS 103 433-1 V1.2.1, said dynamic metadata may be conveyed according to either a so-called parameter-based mode or a table-based mode. The parameter-based mode may be of interest for distribution workflows which primary goal is to provide direct SDR backward compatible services with very low additional payload or bandwidth usage for carrying the dynamic metadata. The table-based mode may be of interest for workflows equipped with low-end terminals or when a higher level of adaptation is required for representing properly both HDR and SDR streams. In the parameter-based mode, dynamic metadata to be conveyed are luminance mapping parameters representative of the inverse mapping function to be applied at the post-processing step, i.e. tmInputSignalBlackLevelOffset; tmInputSignalWhiteLevelOffset; shadowGain; highlightGain; mid Tone WidthAdjFactor; tmOutputFineTuning parameters.

Moreover, other dynamic metadata to be conveyed are color correction parameters (saturationGainNumVal, saturationGainX(i) and saturationGainY(i)) used to fine-tune the default chroma correcting function β(•) as specified in ETSI TS 103 433-1 V1.2.1 clauses 6.3.5 and 6.3.6. The parameters a and b may be respectively carried in the saturationGain function parameters as explained above. These dynamic metadata may be conveyed using the HEVC SL-HDR Information (SL-HDRI) user data registered SEI message (see ETSI TS 103 433-1 Annex A.2) or another extension data mechanism such as specified in the AVS2/IEEE1857.4 specification. Typical dynamic metadata payload size is less than 100 bytes per picture or scene.

Back to FIG. 3, in step 25, the SL-HDRI SEI message is parsed to obtain at least one parameters of the set of parameters SP.

In step 282 and 202, the inverse mapping function (so-called lutMapY) is reconstructed (derived) from the obtained mapping parameters (see ETSI TS 103 433-1 V1.2.1 clause 7.2.3.1 for more details, —same clause for TS 103 433-2 V1.1.1).

In step 282 and 202, the chroma correcting function β(•) (so-called lutCC) is also reconstructed (derived) from the obtained color correction parameters (see ETSI TS 103 433-1 V1.2.1 clause 7.2.3.2 for more details, same clause for TS 103 433-2 V1.1.1).

In the table-based mode, dynamic data to be conveyed are pivots points of a piece-wise linear curve representative of the mapping function. For example, the dynamic metadata are luminanceMappingNumVal that indicates the number of the pivot points, luminanceMappingX that indicates the abscissa (x) values of the pivot points, and luminanceMappingY that indicates the ordinate (y) values of the pivot points (see ETSI TS 103 433-1 V1.2.1 clauses 6.2.7 and 6.3.7 for more details). Moreover, other dynamic metadata to be conveyed may be pivots points of a piece-wise linear curve representative of the chroma correcting function β(•). For example, the dynamic metadata are colorCorrectionNumVal that indicates the number of pivot points, colorCorrectionX that indicates the x values of pivot points, and colorCorrectionY that indicates the y values of the pivot points (see ETSI TS 103 433-1 V1.2.1 clauses 6.2.8 and 6.3.8 for more details). These dynamic metadata may be conveyed using the HEVC SL-HDRI SEI message (mapping between clause 6 parameters and annex A distribution metadata is provided in Annex A.2.3 of ETSI TS 103 433-1 V1.2.1).

In step 25, the SL-HDRI SEI message is parsed to obtain the pivot points of a piece-wise linear curve representative of the inverse mapping function and the pivot points of a piece-wise linear curve representative of the chroma correcting function β(•), and the chroma to luma injection parameters a and b.

In step 282 and 202, the inverse mapping function is derived from those pivot points relative to a piece-wise linear curve representative of the inverse mapping function ITM (see ETSI TS 103 433-1 V1.2.1 clause 7.2.3.3 for more details, —same clause for ETSI TS 103 433-2 V1.1.1).

In step 281 and 201, the chroma correcting function β(•) is also derived from those of said pivot points relative to a piece-wise linear curve representative of the chroma correcting function β(•), (see ETSI TS 103 433-1 V1.2.1 clause 7.2.3.4 for more details, —same clause for TS 103 433-2 V1.1.1).

Note that static metadata also used by the post-processing step may be conveyed by SEI message. For example, the selection of either the parameter-based mode or table-based mode may be carried by the payloadMode information as specified by ETSI TS 103 433-1 V1.2.1 (clause A.2.2). Static metadata such as, for example, the color primaries or the maximum display mastering display luminance are conveyed by a Mastering Display Colour Volume (MDCV) SEI message as specified in AVC, HEVC or embedded within the SL-HDRI SEI message as specified in ETSI TS 103 433-1 V1.2.1 Annex A.2.

According to an embodiment of step 25, the information data ID is explicitly signaled by a syntax element in a bitstream and thus obtained by parsing the bitstream. For example, said syntax element is a part of an SEI message such as sl_hdr_mode_value_minus1 syntax element contained in SL-HDRI SEI message.

According to an embodiment, said information data ID identifies what is the processing applied to the input image to process the set of parameters SP.

According to this embodiment, the information data ID may then be used to deduce how to use the parameters to reconstruct the three components $\{C_3{'''}\}$ (step 25).

For example, when equal to 1, the information data ID indicates that the set of parameters SP has been obtained by applying the SL-HDR1 pre-processing step (step 20) to an input HDR image and that the three components $\{\widetilde{C}_{20}^m\}$ are representative of an SDR image. When equal to 2, the information data ID indicates that the parameters have been obtained by applying the SL-HDR2 pre-processing step (step 20) to an HDR 10 bits image (input of step 20) and that the three components $\{\widetilde{C}_{20}^m\}$ are representative of an HDR10 image.

The present embodiments obtain components $\widetilde{c}_3^2$ and $\widetilde{c}_3^3$, usually denoted chroma components, representative of the chroma components of the output image from color components representative of the input image, and if a value of a pixel in at least one of said chroma components exceeds a given value, modify the value of said pixel in at least one of said color components in such a way that the value of said pixel in said at least one of said chroma components is lower than or equals to said given value.

Determining if a value of a pixel in at least one of said chroma components exceeds a given value allows to detect a very saturated color of the output image, and modifying the value of said pixel in at least one of said color components in such a way that the value of said pixel in said at least one of said chroma components is lower than or equals to said given value, desatures said very saturated color in a range that not affect perceptually the rendered color on a display.

For example, assuming the input image is represented in the RGB color space and the chroma components are the usual U and V chroma components, when a value of a pixel of the U chroma component is higher than a given value, the B component value of said pixel in the input image is often very high compared to the R and G component values of said pixel. Then, according to the present embodiments, the G (and also possibly R) component value of said pixel is (are) modified in such a way that the value of said pixel in said U chroma component, obtained from the modified color components, is lower or equals to said given value.

Similarly, when a value of a pixel of the V chroma component is higher than a given value, the R component value of said pixel in the input image is often very high compared to the B and G component values of said pixel. Then, according to the present embodiments, the G (and also possibly B) component value of said pixel is (are) modified in such a way that the value of said pixel in said V chroma component, obtained from the modified color components, is lower or equals to said given value.

Figure 6:
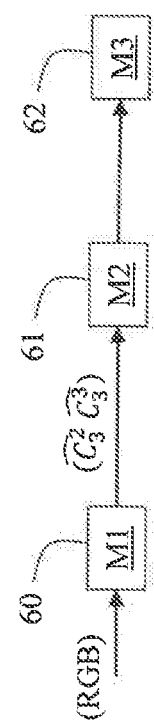
FIG. 6 show a diagram of the steps of a method for encoding an image in accordance with an exemplary embodiment of the present embodiments.

FIG. 6 shows a diagram of the steps of a method for encoding an image in accordance with an exemplary embodiment of the present embodiments.

The method comprises steps 60-62.

The input of step 60 is triplet of color components values representative of the input image. In the following, the triplets of color components refer to triplets of the well-known RGB color space but any other triplets of values representative of an image may be used without limiting the scope of the present embodiments.

As explained above in FIGS. 2 and 3, the three components $\{C_1{'''}\}$ representative of the input image are pre-processed (step 20) and the output three components $\{C_{20}{'''}\}$ are then encoded (step 23) in the bitstream B, the three components $\{\widetilde{C}_{20}^m\}$ are then obtained by decoding (step 26) the bitstream B, and the three components $\{C_3{'''}\}$ representative of the output image are then either obtained directly from the three components $\{\widetilde{C}_{20}^m\}$ or reconstructed (step 28) from the three components $\{\widetilde{C}_{20}^m\}$ and parameters of a set of parameters SP obtained from associated metadata (step 25).

The step 28 is usually implemented by using integer values, i.e. some internal value in this step are integer values belonging to a specific range bounded by a lower bound value LBV and an upper bound value UBV. Typically, this range is defined on 9 bits and a sign bit, i.e. the lower bound value LBV equals −512 and the upper bound value UBV equals 511.

In the course of said post-processing step 28, the components a $C_3^2$, $C_3^3$ of the three components $\{C_3{'''}\}$ are derived by inverse correcting the components $C_2^2$, $C_2^3$ of the three components $\{C_2{'''}\}$ according to the component $C_2^1$ (eq. 6) or, optionally, $C_{2,post}^1$ (eq. 6bis). Said component $C_3^2$, $C_3^3$ are representative of the chroma of the output image, i.e. they are usually denoted the chroma components of the three components $\{C_3{'''}\}$.

In step 60, a module M1 obtains chroma components $\widetilde{c}_3^2$ and $\widetilde{c}_3^3$ representative of the chroma components $C_3^2$, $C_3^3$ of the output image from color components representative of the input image.

According to the first variant of the first exemplary embodiment of the end-to-end workflow of FIG. 2 or FIG. 3, i.e. when SL-HDR1 is considered, the chroma components $\widetilde{c}_3^2$ and $\widetilde{c}_3^3$ are obtained by eq. (14) obtained from eqs. (9)-(10):

$$\begin{bmatrix}\widetilde{c}_3^2\\\widetilde{c}_3^3\end{bmatrix} = \frac{1}{C_{1,pre}^1}\cdot\begin{bmatrix}A_2\\A_3\end{bmatrix}\begin{bmatrix}R^{1/\gamma}\\G^{1/\gamma}\\B^{1/\gamma}\end{bmatrix} \quad (14)$$

assuming encoding/decoding are not taking into account $$\left(\begin{bmatrix}C_2^2\\C_2^3\end{bmatrix}=\begin{bmatrix}C_{12}^2\\C_{12}^3\end{bmatrix}\right),$$

$$\beta(C_{1,pre}^1)=\frac{\Omega}{C_{1,pre}^1} \text{ and } C_{2,post}^1 = C_{1,pre}^1$$

(when eq. 6bis is considered, similar result when eq. (6) is considered).

According to the second exemplary embodiment of the end-to-end workflow of FIG. 2 or FIG. 3, i.e. when SL-HDR2 is considered, the chroma components $\widetilde{c}_3^2$ and $\widetilde{c}_3^3$ are obtained by eq. (15) when considering no display adaptation functionality, i.e. considering modFactor equal to 0 in ETSI TS 103 433-2 V1.1.1, section 7.2.3.2:

$$\begin{bmatrix}\widetilde{c}_3^2\\\widetilde{c}_3^3\end{bmatrix} = \beta(C_{1,pre}^1)\cdot\begin{bmatrix}A_2\\A_3\end{bmatrix}\begin{bmatrix}R''\\G''\\B''\end{bmatrix} = \frac{1}{C_{1,pre}^1}\begin{bmatrix}A_2\\A_3\end{bmatrix}\begin{bmatrix}R''\\G''\\B''\end{bmatrix} \quad (15)$$

where R"=EOTFPQ(R), G"=EOTFPQ(G), B"=EOTFPQ(B) and EOFTPQ(•) and where EOTFPQ(•) is specified in SMPTE ST 2084, and assuming encoding/decoding are not taking into account $$\left( \begin{bmatrix} C_2^2 \\ C_2^3 \end{bmatrix} = \begin{bmatrix} C_{12}^2 \\ C_{12}^3 \end{bmatrix} \right) \text{ and } C_{2,post}^1 = C_{1,pre}^1$$

(when eq. 6bis is considered, similar result when eq. (6) is considered).

In step 61, a module M2 checks if a value $\widehat{c}_3^2(p)$ or $\widehat{c}_3^3(p)$ of a pixel p in at least one of said chroma components $\widehat{c}_3^2$ and $\widehat{c}_3^3$ exceeds a given value.

According to an embodiment, the given value depends on a maximal integer value before clipping of the value $\widehat{c}_3^2(p)$ or $\widehat{c}_3^3(p)$ of a pixel p in at least one of said chroma component $\widehat{c}_3^2$ and $\widehat{c}_3^3$.

Said given value may be lower or equals to an upper bound value UBV.

According to a variant of step 61, the module M2 checks if a value $\widehat{c}_3^2(p)$ of a pixel p in the chroma components $\widehat{c}_3^2$ exceeds a first given value, and the module M2 checks if a value $\widehat{c}_3^3(p)$ of said pixel p in the chroma components $\widehat{c}_3^3$ exceeds a second given value, and said first and second given values are different values.

Defining different given values for the chroma components introduces special effects on the colors obtained from the three components $\{C_3^m\}$ because the chroma components a $C_3^2$, $C_3^3$ of the three components $\{C_3^m\}$ are not then treated according to a same processing.

If a value $\widehat{c}_3^2(p)$ or $\widehat{c}_3^3(p)$ of a pixel p in said chroma component $\widehat{c}_3^2$ or $\widehat{c}_3^3$ respectively, exceeds the given value, then, in step 62, a module M3 modifies the value of said pixel p in at least one of said color components in such a way that the value of said pixel p in said at least one of said chroma components is lower than or equals to said given value.

According to an embodiment of step 62, the value of said pixel p in a single color component is modified.

For example, assuming the input image is represented in the RGB color space, the G component is the single color component to be modified.

According to a variant of said embodiment of step 62, the value of said pixel p in the single color component is replaced by a value Val(p) obtained when the value $\widehat{c}_3^2(p)$ (or $\widehat{c}_3^3(p)$) of said pixel p in said chroma component $\widehat{c}_3^2$ (or $\widehat{c}_3^3$) equals to said given value, i.e., for example, $\widehat{c}_3^2(p)$ (or $\widehat{c}_3^3(p)$)=UBV when the given value equals UBV.

For example, when the G component is the single color component to be modified, the value Val(p) is computed when $\widehat{c}_3^2$ is lower than or equals to UBV by:

$$Val(p) \leq invEOTF\left( \frac{UBV \cdot K - A_{21}EOTF(R) - A_{23}EOTF(B)}{A_{22}} \right) \quad (16)$$

where $K=C_{1,pre}^1$, $EOTF(X)=X^{1/\gamma}$ and $invEOFT(Y)=Y^\gamma$ when eq. (14) is considered and $K=C_{1,pre}^1$, $EOTF(X)=EOTFPQ(X)$ and $invEOTF(Y)=InvEOTFPQ(Y)$ where $invEOTF(Y)$ is the functional inverse of the $EOTFPQ(\bullet)$ function when eq. (15) is considered.

Similar equation may be obtained when the chroma component $\widehat{c}_3^2$ (that represents the usual V chroma component) is lower than or equals to UBV:

$$Val(p) \leq invEOTF\left( \frac{UBV \cdot K - A_{31}EOTF(R) - A_{33}EOTF(B)}{A_{32}} \right) \quad (17)$$

where $K=C_{1,pre}^1$, $EOTF(X)=X^{1/\gamma}$ and $invEOFT(Y)=Y^\gamma$ when eq. (14) is considered and $K=C_{1,pre}^1$, $EOTF(X)=EOTFPQ(X)$ and $invEOTF(Y)=InvEOTFPQ(Y)$ where $invEOTF(Y)$ is the functional inverse of the $EOTFPQ(\bullet)$ function when eq. (15) is considered.

According to another embodiment of step 62, a first value Val1(p) is obtained according to eq. (16) when the value $\widehat{c}_3^2(p)$ of said pixel p in a first chroma component $\widehat{c}_3^2$ equals to a first given value, a second value Val2(p) is obtained according to eq. (17) when the value $\widehat{c}_3^3(p)$ of said pixel p in a second chroma component $\widehat{c}_3^3$ equals to a second given value.

Then, a maximal value MaxVal(p) of said pixel p is determined as being either said first value Val1(p) if said first value Val1(p) is greater than the second value Val2(p) or said second value Val2(p) otherwise.

The first and second given values may equal to different values UBV1 and UBV2 or to a same value, typically 511 when the values are represented by using 9 bits (+1 sign bit), i.e. the given values equal to the upper bound value UBV.

Finally, in step 62, the value of said pixel p in a single color component is modified by replacing the value of said pixel p in said single color component by said maximal value MaxVal(p).

According to a variant in step 62, the value of said pixel p in a single color component is replaced by said maximal value MaxVal(p) if said maximal value MaxVal(p) of said pixel p is strictly greater than 0 and strictly greater than the value of said pixel p in said single color component.

According to an embodiment of step 62, the value of said pixel p in a first color component is modified as explained above, and the value of said pixel p in a second color component is also modified, said second color component being determined according to said first and second values Val1(p) and Val2(p).

For example, assuming the input image is represented in the RGB color space and the chroma components are the usual U and V chroma components, the first value Val1(p) refers to the U chroma component and the second value Val2(p) refers to the V chroma component V. The second color component is the R color component when Val1(p) >Val2(p) and B color component otherwise.

According to a variant of said embodiment of step 62, the value of said pixel p in the second color component is modified by multiplying said value of said pixel p in said second color component by a ratio of the maximal value MaxVal(p) over the value of said pixel p in the first color component.

For example, assuming the input image is represented in the RGB color space and the chroma components are the usual U and V chroma components, the first value Val1(p) refers to the U chroma component and the second value Val2(p) refers to the V chroma component V. Then, if Val1(p) is greater than Val2(p), i.e. MaxVal(p)=Val1( ) and the very saturation of the color is due to the U chroma component, the R component is the second color component to be modified by:

R(p)=R(p)·Val1(p)/Value(p) where Value(p) is the value of the pixel p in said first color component (e.g. G) before modification of the value of said pixel in said first color component.

In that way the high value of the B component is compensated by increasing the R component value, leading to a global desaturation of the color of the pixel p in the output image.

If Val1(p) is lower than Val2(p), i.e. MaxVal(p)=Val2( ) and the very saturation of the color is due to the V chroma component, the B component is the second color component to be modified by:

B(p)=B(p)·Val2(p)/Value(p) where Value(p) is the value of the pixel p in said first color component (e.g. G) before modification of the value of said pixel in said first color component.

In that way the high value of the R component is compensated by increasing the B component value, leading to a global desaturation of the color of the pixel p in the output image.

According to a variant of step 62, the value of said pixel p in the second color component is modified only if MaxVal (p) is greater than a given value LOW, for example, 25 when the range is defined on 9 bits.

This variant avoids introduction of unexpected color shifts on the reconstructed image $I_3$ because the ratio between MaxVal(p)/Val(p) does not take very high values even if val(p) is low.

According to another variant of step 62, the value of said pixel p in the second color component is modified only if the value val(p) of said pixel p in the input image is lower than the value of said pixel p in the single (or first) color component, for example the G component.

This variant avoids introduction of unexpected color shifts on the output image when R (or B) color component is relatively high because the application of the ratio MaxVal (p)/val(p) to the R (or B) color component will not produce too high R (or B) color value that could introduce unexpected colors in the output image.

According to another variant, the gamma factor of the gamma-encoded single color component is modified when the MaxVal(p) is lower than a given value LOW2.

Typically, LOW2=1.0 and the gamma factor equals 2.0 when MaxVal(p)<LOW2 and 2.4 otherwise.

This has the effect of not amplifying so much the luminance of very dark values, avoiding some unexpected colors to pop up in the output image.

On FIGS. 1-4c and 6 the modules are functional units, which may or not be in relation with distinguishable physical units. For example, these modules or some of them may be brought together in a unique component or circuit or contribute to functionalities of a software. A contrario, some modules may potentially be composed of separate physical entities. The apparatus which are compatible with the present embodiments are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a apparatus or from a blend of hardware and software components.

FIG. 5 represents an exemplary embodiment of an architecture of a apparatus 50 which may be configured to implement a method described in relation with FIG. 1 to FIG. 4c.

Apparatus 50 comprises following elements that are linked together by a data and address bus 51: a microprocessor 52 (or CPU), which is, for example, a DSP (or Digital Signal Processor), a ROM (or Read Only Memory) 53, a RAM (or Random Access Memory) 54, an I/O interface 55 for reception of data to transmit, from an application and optionally a battery 56. In accordance with an example, the battery 56 is external to the apparatus. In each of mentioned memory, the word «register» used in the specification can correspond to area of small capacity (some bits) or to very large area (e.g. a whole program or large amount of received or decoded data). The ROM 53 comprises at least a program and parameters. The ROM 53 may store algorithms and instructions to perform techniques in accordance with present embodiments. When switched on, the CPU 52 uploads the program in the RAM 54 and executes the corresponding instructions. RAM 54 comprises, in a register, the program executed by the CPU 52 and uploaded after switch on of the apparatus 50, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a apparatus), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing apparatuses in general, including, for example, a computer, a microprocessor, an integrated circuit, or a programmable logic apparatus. Processors also include communication apparatuses, such as, for example, computers, cell phones, portable/personal digital assistants ("PDAs"), and other apparatuses that facilitate communication of information between end-users.

In accordance with an example, the input video or an image of an input video is obtained from a source. For example, the source belongs to a set comprising a local memory (53 or 54), e.g. a video memory or a RAM (or Random Access Memory), a flash memory, a ROM (or Read Only Memory), a hard disk, a storage interface (55), e.g. an interface with a mass storage, a RAM, a flash memory, a ROM, an optical disc or a magnetic support, a communication interface (55), e.g. a wireline interface (for example a bus interface, a wide area network interface, a local area network interface) or a wireless interface (such as a IEEE 802.11 interface or a Bluetooth® interface); and an image capturing circuit (e.g. a sensor such as, for example, a CCD (or Charge-Coupled Device) or CMOS (or Complementary Metal-Oxide-Semiconductor)).

In accordance with examples, the bitstream carrying on the metadata is sent to a destination. As an example, a bitstream is stored in a local or remote memory, e.g. a video memory or a RAM (54), a hard disk. In a variant, at least one of the bitstreams is sent to a storage interface (55), e.g. an interface with a mass storage, a flash memory, ROM, an optical disc or a magnetic support and/or transmitted over a communication interface (55), e.g. an interface to a point to point link, a communication bus, a point to multipoint link or a broadcast network.

In accordance with other examples, the bitstream carrying on the metadata is obtained from a source. Exemplarily, the bitstream is read from a local memory, e.g. a video memory (54), a RAM (54), a ROM (53), a flash memory (53) or a hard disk (53). In a variant, the bitstream is received from a storage interface (55), e.g. an interface with a mass storage, a RAM, a ROM, a flash memory, an optical disc or a magnetic support and/or received from a communication interface (55), e.g. an interface to a point to point link, a bus, a point to multipoint link or a broadcast network.

In accordance with examples, apparatus 50 being configured to implement the method as described above, belongs to a set comprising a mobile device, a communication device, a game device, a tablet (or tablet computer), a laptop, a still image camera, a video camera, an encoding/decoding chip, a television, a set-top-box, a display, a still image server and a video server (e.g. a broadcast server, a video-on-demand server or a web server).

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing an image or a video or other communication apparatuses. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments can be applied, is merely an illustrative and not exhaustive listing as is readily appreciated by one of ordinary skill in the art: a portable computer; a floppy disk; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a apparatus configured to carry out a process and a apparatus that includes a processor-readable medium (such as a storage apparatus) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present embodiments, or to carry as data the actual syntax-values written by a described example of the present embodiments. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
obtaining chroma components representative of chroma components of an output image from color components representative of an input image, said color components being in an RGB color space;
said output image being obtained by applying a decoding and a post-processing to an encoded image, said encoded image being obtained by applying a pre-processing and encoding to said input image;
in response to a determination that a value of a pixel in at least one of said chroma components exceeds a given value, generating a modified value of said pixel in at least one of said color components of the input image, the value of said pixel in said at least one of said chroma components obtained from the modified value of said pixel in the at least one of said color components being lower than or equal to said given value; and
inserting the modified value of said pixel in the at least one of said color components into the input image.

2. The method of claim 1, wherein the given value depends on a maximal integer value before clipping of the value of said pixel in at least one of said chroma components.

3. The method of claim 1, further comprising:
comparing a value of said pixel in a first of said at least one of said chroma components with a first given value; and
comparing a value of said pixel in a second of said at least one of said chroma components with a second given value, said first and second given values being different values.

4. The method of claim 1, wherein generating the modified value of said pixel in at least one of said color components comprises generating a modified value of said pixel in a single color component.

5. The method of claim 4, wherein generating the modified value of said pixel in at least one of said color components comprises replacing the value of said pixel in the single color component with a value obtained when a value of said pixel in said at least one of said chroma components is lower than or equal to said given value.

6. The method of claim 4, wherein generating the modified value of said pixel in at least one of said color components comprises:
obtaining a first value if the value of said pixel in a first chroma component equals to a first given value;

obtaining a second value if the value of said pixel in a second chroma component equals to a second given value;

determining a maximal value of said pixel as being either said first value if said first value is greater than the second value or said second value otherwise; and replacing the value of said pixel in the single color component with said maximal value.

7. The method of claim 6, wherein said maximal value is greater than 0 and greater than the value of said pixel in said single color component.

8. The method of claim 1, wherein generating the modified value of said pixel in at least one of said color components comprises:

obtaining a value of said pixel in first color component; and obtaining a value of said pixel in a second color component, said second color component being determined according to a first value and a second value, said first value being obtained if a value of said pixel in a first chroma component equals a first given value, and said second value being obtained if a value of said pixel in a second chroma component equals to a second given value.

9. The method of claim 8, wherein generating the modified value of said pixel in at least one of said color components further comprises multiplying said value of said pixel in said second color component by a ratio of a maximal value over the value of said pixel in the first color component, said maximal value of said pixel being determined as either said first value if said first value is greater than the second value or said second value otherwise.

10. The method of claim 9, wherein the value of said pixel in the second color component is modified if said maximal value is greater than a given value.

11. The method of claim 8, wherein the value of said pixel in the second color component is modified if the value of said pixel in the input image is lower than the value of said pixel in the first color component.

12. An apparatus comprising one or more processors configured for:

obtaining chroma components representative of chroma components of an output image from color components representative of an input image, said color components being in an RGB color space;

said output image being obtained by applying a decoding and a post-processing to an encoded image, said encoded image being obtained by applying a pre-processing and encoding to said input image;

in response to a determination that a value of a pixel in at least one of said chroma components exceeds a given value, generating a modified value of said pixel in at least one of said color components of the input image in such a way that the value of said pixel in said at least one of said chroma components obtained from the modified value of said pixel in the at least one of said color components being lower than or equal to said given value; and insert the modified value of said pixel in the at least one of said color components into the input image.

13. The apparatus of claim 12, wherein the given value depends on a maximal integer value before clipping of the value of said pixel in at least one of said chroma components.

14. The apparatus of claim 12, wherein a value of said pixel in a first of said at least one of said chroma components is compared with a first given value and, a value of said pixel in a second of said at least one of said chroma components is compared with a second given value and said first and second given values are different values.

15. The apparatus of claim 12, wherein the value of said pixel in a single color component is modified.

16. The apparatus of claim 15, wherein the value of said pixel in at least one of said color components is modified by replacing the value of said pixel in the single color component by a value obtained when the value of said pixel in the at least one of said chroma components is lower than or equal to said given value.

17. The apparatus of claim 15, wherein a first value is obtained when the value of said pixel in a first chroma component equals to a first given value, a second value is obtained when the value of said pixel in a second chroma component equals to a second given value; and wherein a maximal value of said pixel is determined as being either said first value if said first value is greater than the second value or said second value otherwise, and the value of said pixel in at least one of said color components is modified by replacing the value of said pixel in the single color component by said maximal value.

18. The apparatus of claim 17, wherein the value of said pixel in said single color component is replaced by said maximal value if said maximal value is greater than 0 and greater than the value of said pixel in said single color component.

19. The apparatus of claim 18, wherein said single color component is considered as being a first color component, the value of said pixel in a second color component is also modified, said second color component being determined according to a first value and a second value, said first value being obtained when the value of said pixel in a first chroma component equals to a first given value, and said second value being obtained when the value of said pixel in a second chroma component equals to a second given value.

20. A non-transitory processor-readable medium carrying instructions that cause a computing device to:

obtain chroma components representative of chroma components of an output image from color components representative of an input image, said color components being in an RGB color space;

said output image being intended to be obtained by applying a decoding and a post-processing to an encoded image, said encoded image being obtained by applying a pre-processing and encoding to said input image; and in response to a determination that a value of a pixel in at least one of said chroma components exceeds a given value, modify a value of said pixel in at least one of said color components of the input image, the value of said pixel in said at least one of said chroma components obtained from the modified value of said pixel in the at least one of said color components being lower than or equal to said given value; and insert the modified value of said pixel in the at least one of said color components into the input image.

* * * * *